E. E. PRINCE.
FISHWAY.
APPLICATION FILED FEB. 25, 1914.
1,157,639.
Patented Oct. 19, 1915.
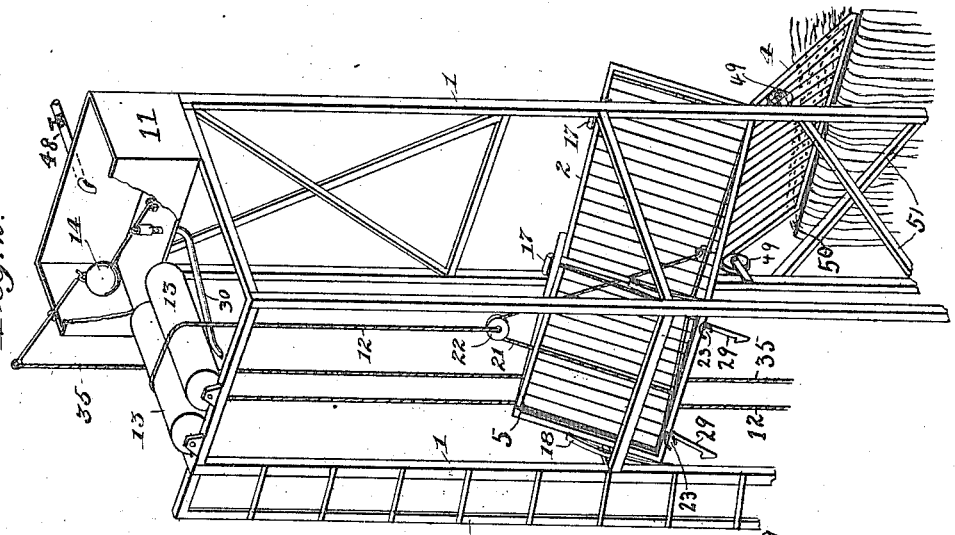
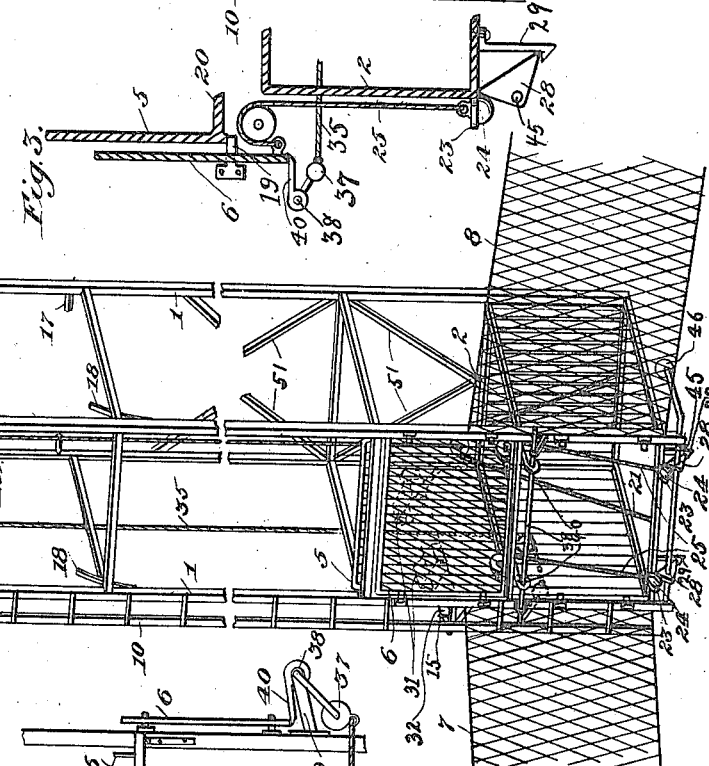
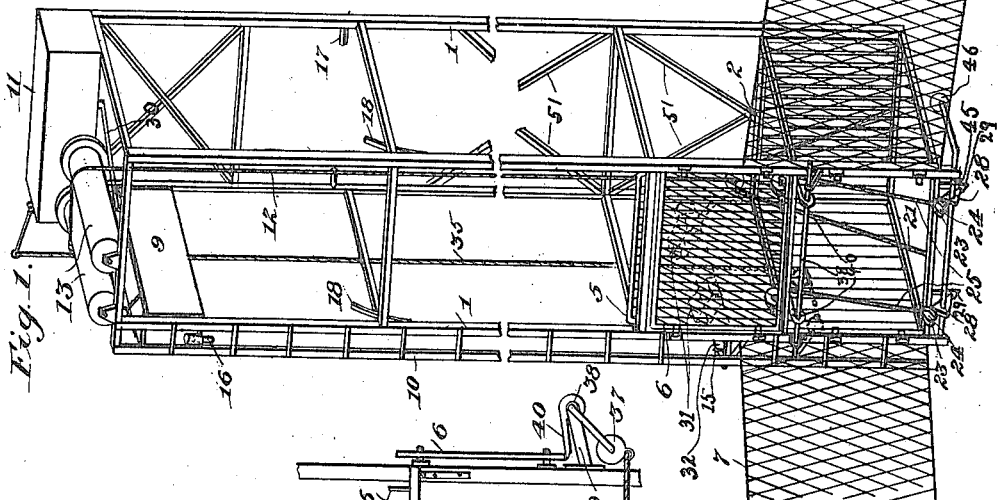
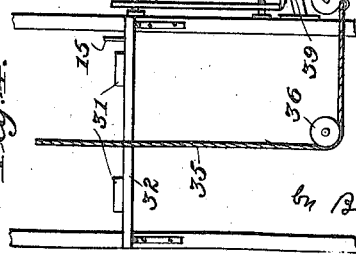
Witnesses:
E. Daniels
C. H. Potter
Inventor:
Edward Ernest Prince
by Byrnes Townsend & Brickenstein
Att'ys.

UNITED STATES PATENT OFFICE.

EDWARD ERNEST PRINCE, OF OTTAWA, ONTARIO, CANADA.

FISHWAY.

1,157,639.   Specification of Letters Patent.   Patented Oct. 19, 1915.

Application filed February 25, 1914. Serial No. 820,900.

*To all whom it may concern:*

Be it known that I, EDWARD ERNEST PRINCE, a subject of the King of Great Britain, residing at Ottawa, in the Province of Ontario and Dominion of Canada, have invented certain new and useful Improvements in Fishways, of which the following is a specification.

My invention relates to fishways, also called fish-passes, and has for its object to enable migratory fishes to surmount waterfalls and other natural obstructions, also artificial dams or other barriers in rivers, lakes, and other water courses.

The invention comprises the guiding of migratory fish into a fish-compartment or inclosure, impounding them therein, and preventing their return or escape, until they have been elevated in the ascending fish-compartment to the summit of the obstruction, where their compulsory liberation or discharge is effected into a suitable gangway or sluice leading to the waters above such obstruction.

In the attached drawings,—Figure 1 is a view in perspective of the fishway, showing the fish-compartment open ready to receive fish; Fig. 2 is a partial view of the fishway, showing the fish-compartment at the top, and discharging the fish into the gangway or sluice leading into the water above the obstruction; Fig. 3 shows some details of the gate latches; and Fig. 4 is another view showing a gate latch and a supporting shelf on the side of the structure.

The fishway consists of a suitable rectangular structure or guideway 1, either vertical, as shown, or inclined, depending upon local conditions, composed of uprights suitably braced, and within which is a movable cage 2, called the fish-compartment, automatically elevated periodically, either by a counterpoise-tank 9, or by electric, steam, or other power. The fish-compartment 2 may be made water-tight, or partially so, or of suitable gratings or nets, as desired. The entire structure is made so as to be readily taken apart and moved from place to place, as may be desired. The fish-compartment 2 has a door 4 (see Fig. 2) which opens outward when the compartment is at the top and discharging, but closed at other times; and another door 5 which is held open while the cage is at the bottom, to admit the fish, and closed at other times. Attached to the structure 1 is a gate 6, placed in front of the gate 5, preventing admission of the fish to the space occupied by the fish-compartment while the latter is being elevated and discharged. Leading in both directions from the entrance to the fish-compartment are nets, walls, or guides 7, 8, which tend to direct the fish into the compartment.

In the drawings, the fish-compartment is shown as elevated automatically by a counterpoise-tank 9, which slides in the guides 10, also supporting a ladder. The counterpoise-tank is filled with water, intermittently, from a supply-tank 11, and is connected to the fish-compartment by a suitable rope or cable 12, running over the pulleys or drums 13, 13. Water is supplied to the supply-tank by a hydraulic ram, gravitation, or other means, through the valved pipe 48, and is automatically discharged therefrom periodically by a ball-valve 14, or other suitable means, through pipe 30 into the counterpoise-tank 9, the latter then descending and raising the fish-compartment, which discharges automatically at the top. At the bottom, the descent of the tank 9 is gently checked by shock absorbers or buffers 31 on the adjustable shelf 32, and the water automatically discharged by the arm 15 actuating the valve 16, or by other suitable means, the rapidity of discharge of the water being suitably controlled by the adjustment of the valve; the empty tank 9 then rises by the descent of the empty and heavier fish-compartment 2, to be again filled. The frequency of travel of the compartment and counterpoise-tank may be controlled by suitably adjusting all the valves, and by the size of the pipes through which the water flows to or from either tank. During the time the counterpoise-tank is being filled, as above described, the fish-compartment is at the bottom with its gate or door 4 at the discharge end closed, and the gates 5 and 6 open to admit the fish.

The fish-compartment is suspended by a rope or chain 21, attached to the sides or ends, and passing over one or more pulleys 22 so suspended from the rope 12 as to render unstable the center of gravity of the compartment 2, and facilitate its easy tilting when the summit is reached.

The gates 5 and 6 are operated as follows: During the descent of the compartment, gate 5, which is held in guides (not shown), on the entrance of the compartment, engages lug 19 attached to the structure 1, and is retained thereby, opening the compartment by the continued descent of the latter; on its further descent, the claws 23, 23, projecting outward from the bottom of the compartment, engage the weights or knobs 24, 24, attached to the gate 6 by the ropes 25, 25, the continued descent of the compartment raising the gate 6, and affording an unobstructed entrance to the compartment for the fish. As the compartment reaches the bottom, the latches 29, 29 engage the bottom of the shoes 28, 28, the latter being supported on the rod 45, and weighted by the ball-weight 46.

When the supply tank 11 is nearly full, the ball-valve 14 lowers the rope 35 and releases the catch 40 from gate 6; the catch 40 being supported on shaft 38 by brackets 39, and carrying the ball-weight 37 to assist in opening the catch. The raising of the ball-valve 14 permits the rapid discharge of water from tank 11 to tank 9, which then descends and raises the compartment 2. At the moment of the ascent of the compartment, the shoes 28 are automatically operated by the latches 29, immediately dislodging the knobs 24, 24, thereby suddenly closing gate 6, as in ordinary automatic hatchways, and preventing access by the fish to the space at the bottom of the structure 1 occupied by the compartment; the closing of the gate also preventing the exit of the fish from the rising compartment. On its continued ascent, the floor of the compartment engages the foot 20 of the gate 5, carrying the gate upward and thereby closing the compartment. On its continued ascent, rollers 17, 17, are engaged which coöperate with the curved ways or guides 18, 18, in tilting the compartment; the gate 4 is then automatically opened, resting on the rolls 49, 49, and the fish discharged over the dam or other obstruction 50, into the sluice-way above. The fish-compartment then automatically descends, closing gate 4, the latter being held shut by the cross-braces 51; the tank 9 having automatically discharged while the fish were being discharged.

All of the parts are preferably secured together by non-corrodible bolts, such as those of bronze, etc., to facilitate easy disconnecting for removal and erection elsewhere.

I claim:—

1. In a fish-way, the combination of a fish-compartment, means for admitting fish thereto and for retaining them therein, means operating automatically at predetermined intervals for transferring the fish-compartment from one level to another, and automatic means for releasing the fish after the transfer.

2. In a fish-way, the combination of a fish-compartment, means for opening the compartment to admit fish thereto and for closing it to retain them therein, means operating automatically at predetermined intervals for transferring the fish-compartment from one level to another, and automatic means for releasing the fish after the transfer.

3. In a fish-way, the combination of a fish-compartment, automatically operating means for opening the compartment to admit fish thereto and for closing it to retain them therein, means operating automatically at predetermined intervals for transferring the fish-compartment from one level to another, and automatic means for releasing the fish after the transfer.

4. In a fish-way, the combination of a guide-way, a fish-compartment in said guide-way, a gate closing the entrance to said fish-compartment; and means on said gate coöperating with said fish-compartment to open and close said gate.

5. In a fish-way, the combination of a guide-way, a reciprocating fish-compartment, a gate closing the entrance to said fish-compartment, a second gate closing said fish-compartment, and means for opening the second gate before the opening of the first gate on the descent of said fish-compartment.

6. In a fish-way, the combination of a guide-way, a reciprocating fish-compartment, a gate closing the entrance to said fish-compartment, a second gate closing said fish-compartment, and means for closing said first gate before the closing of said second gate on the ascent of said fish-compartment.

7. In a fish-way, the combination of a guide-way, a reciprocating fish-compartment, gates closing the entrance to said fish-compartment, a discharge-gate, and means for automatically tilting said fish-compartment and opening said discharge-gate on the ascent of said fish-compartment.

8. In a fish-way, the combination of a guide-way, a reciprocating fish-compartment, a reciprocating counterpoise-tank for operating said fish-compartment, means for automatically filling said tank with water, means for automatically discharging said water, and means for controlling the frequency of reciprocations of said counterpoise-tank and fish-compartment.

9. In a fish-way, the combination of a guide-way, a reciprocating fish-compartment, a gate closing the entrance to the space occupied by said compartment, means for automatically opening and closing said gate, and inclined guides or walls leading to said entrance.

10. In a fish-way, the combination of a fish-compartment, a gate closing the entrance to said compartment, a discharge-gate to said compartment, means for reciprocating said compartment, means for tilting said compartment, means for opening said discharge-gate, and a sluice or gangway leading from said open discharge-gate.

In testimony whereof I affix my signature in presence of two witnesses.

EDWARD ERNEST PRINCE.

Witnesses:
JESSIE CLARKE,
J. W. WATSON.